(12) United States Patent
Yoon

(10) Patent No.: US 6,793,582 B2
(45) Date of Patent: Sep. 21, 2004

(54) PULLEY TYPE CONSTANT VELOCITY JOINT

(75) Inventor: Yong San Yoon, Taejon (KR)

(73) Assignee: Korea Advanced Institute of Science and Technology, Taejon (KR)

(*) Notice: Subject to any disclaimer, the term of this patent is extended or adjusted under 35 U.S.C. 154(b) by 0 days.

(21) Appl. No.: 09/988,881

(22) Filed: Nov. 20, 2001

(65) Prior Publication Data

US 2002/0177484 A1 Nov. 28, 2002

(30) Foreign Application Priority Data

May 25, 2001 (KR) ......................................... 2001-29080

(51) Int. Cl.[7] ................................................. F16D 3/60
(52) U.S. Cl. ....................................... 464/56; 464/904
(58) Field of Search ............................. 464/51, 55, 56, 464/904

(56) References Cited

U.S. PATENT DOCUMENTS

| | | | | |
|---|---|---|---|---|
| 854,426 A | * | 5/1907 | Lowry | ......................... 464/55 |
| 1,373,393 A | * | 3/1921 | Langworthy | |
| 1,403,679 A | * | 1/1922 | Forsyth | ......................... 464/55 |
| 4,242,048 A | * | 12/1980 | McArdle | .................. 464/55 X |
| 6,139,437 A | * | 10/2000 | Thompson | ................ 464/56 X |

* cited by examiner

Primary Examiner—Greg Binda
(74) Attorney, Agent, or Firm—Allen, Dyer, Doppelt, Milbrath & Gilchrist, P.A.

(57) ABSTRACT

A pulley type constant velocity joint may include first and second shafts for transmitting and receiving power therebetween, first and second pulleys being fixedly attached to ends of the first and second shafts, respectively, and first and second wires wound around circumferential grooves of the first and second pulleys to allow the first and second pulleys to be rotated with reference to the center of the first and second pulleys. Further, first and second support frames may be included for rotatably supporting each center of the first and second pulleys, both ends of which are rotatably connected to each other. The constant velocity joint may also include two rotating pins to rotatably connect the first and second pulleys and the frames at the centers of the first and second pulleys, and two connecting pins for connecting the first and the second frames at their ends and for allowing rotation of the frames.

14 Claims, 8 Drawing Sheets

PULLEY TYPE CONSTANT VELOCITY JOINT

FIELD OF THE INVENTION

The present invention relates to constant velocity joints, and, more particularly, to a pulley type constant velocity joint which is capable of transmitting the rotational movement of an input shaft to an output shaft at the same velocity, and which is capable of adjusting the intersection angle of the input and output shafts within about 90°.

BACKGROUND OF THE INVENTION

In general, since the wheels of an automobile are moved up and down while the automobile moves on the road, the angle between the wheel and a drive shaft is varied. A perspective view showing a conventional constant velocity joint is shown in FIG. 1, and a detailed perspective view showing the principal elements of the conventional constant velocity joint of FIG. 1. is shown in FIG. 2. As may be seen in these drawings, the conventional constant velocity joint includes input and output shafts 1 and 2 to be rotated by a driving force from the engine of an automobile, a Birfield joint 5 for adjusting the intersection angle of the input and output shafts 1 and 2, a Birfield joint boot 3, and a dust cover 7.

Here, the Birfield joint 5 includes an outer ring 11 to which the output shaft 2 is attached. The outer ring 11 is provided in its interior with an inner surface 12. Six guide grooves 13 are formed along the inner surface 12 of the outer ring 11 at regular intervals. The inner surface 12 is formed to have a truncated sphere shape.

An inner ring 14 connected with the input shaft 1 is inserted into the outer ring 11 and has an outer surface of a truncated sphere shape. A plurality of guide grooves 15 are formed along the outer surface of the inner ring 14 to correspond to the guide grooves 13 of the outer ring 11. Also, the center of the inner ring 14 has a hole 19 to be inserted on one end of the input shaft 1.

A plurality of balls (i.e., ball bearings) 16 are inserted into the spaces defined by the grooves 13 of the outer ring 11 and the grooves 15 of the inner ring 14. Additionally, a cage 18 having holes 17 corresponding to the number of the balls 16, or the number of the grooves 13 or 15 (e.g., six) which are regularly formed, is inserted between the outer ring 11 and the inner ring 14 to hold the balls 16 at the constant positions defined by the guide grooves 13 and 15. Each ball 16 is situated between opposite guide grooves 13 and 15 and holes 17 of the cage 18. The ball 16 is slidably rotated within the guide grooves 13 and 15.

The operation of the conventional constant velocity joint as described above will now be described. Each ball 16 is situated at a constant position within two opposite guide grooves 13 and 15 when the input shaft 1 is aligned with the output shaft 2, and the ball 16 is slidably situated at a position different from the constant position within the guide grooves 13 and 15 when the input shaft 1 is not aligned with the output shaft 2. Therefore, the balls 16 flexibly transmit power from the input shaft 1 to the output shaft 2 even though the axis of the two shafts 1 and 2 are not aligned with each other.

In such a case, the inner ring 14 and the outer ring 16 are brought into contact with one point of each ball 16, respectively. Furthermore, the rotating force of the inner ring 14 is transmitted to the balls 16 through the contact points between the inner ring 14 and the balls 16, and the rotating force transmitted to the balls 16 is transmitted to the outer ring 11 through the contact points between the outer ring 11 and the balls 16.

In the conventional constant velocity joint described above, the inner and outer rings 14 and 11 may become fatigue-fractured due to the concentration of stress on the contact points, and stress may well be excessively concentrated on the balls 16. In addition, the conventional constant velocity joint typically includes contact portions and guide grooves 11 and 15, which make fabrication of the joint difficult and the structure of the joint complicated.

Moreover, the conventional constant velocity joint can allow a maximum 46.5° as the intersection angle of the input and output shafts at which the balls 16 may be kept stably within the guide grooves 13 and 15 and at which power can be transmitted from the input shaft 1 to the output shaft 2. Thus, the conventional constant velocity joint can only be used for an intersection angle of less than 46.5°.

SUMMARY OF THE INVENTION

An object of the present invention is to provide a pulley type constant velocity joint in which an elongate members or wires are wound around the circumferential grooves of two pulleys, thereby allowing the range of the intersection angle of input and output shafts to be maximized while transmitting the velocity of the input shaft to the output shaft.

Another object of the present invention is to provide a pulley type constant velocity joint in which the wires are wound around the circumferential grooves of the pulleys to allow the input and output shafts to maintain bilateral symmetry with each other and to transmit the axial rotation velocity of the input shaft to the output shaft to cause the structure of the joint to be relatively simple.

A further object of the present invention is to provide a pulley type constant velocity joint in which the wires are wound around the circumferential grooves of the pulleys to transmit the axial rotation velocity of the input shaft to the output shaft and reduce the failure rate of the joint.

To accomplish the above objects, the present invention provides a pulley type constant velocity joint which may include first and second shafts for transmitting and receiving power therebetween, first and second pulleys being fixedly attached to ends of the first and second shafts, respectively, and first and second wires wound around the circumferential grooves of the first and second pulleys to allow the first and second pulleys to be rotated with respect to the center of the first and second pulleys. Furthermore, first and second support frames may also be included for rotatably supporting each center of the first and second pulleys, both ends of which are rotatably connected with each other. The pulley type constant velocity joint may also include two rotating pins to rotatably connect with the first and second pulleys and the frames at the centers of the first and second pulleys, and two connecting pins for connecting the first and the second frames at their ends and for allowing the frames to rotate according to the rotation of the first and second shafts.

The present invention also relates to a pulley type constant velocity joint which may include first and second shafts for transmitting and receiving power therebetween, first and second pulleys being fixedly attached to each end of said first and second shafts and symmetrically rotating with respect to each center thereof as a first degree of freedom, and first and second wires wound around the circumferential grooves of the first and second pulleys to symmetrically rotate the first and second pulleys with respect to each of the centers. Additionally, first and second support frames may be included for rotatably supporting each center of the first and second pulleys and rotatably connecting both ends thereof as a second degree of freedom.

Further, the present invention also provides a pulley type constant velocity joint which may include first and second shafts, first and second pulleys, and first and second wires to make the first and second shafts have a first degree of freedom and transmit and receive power therebetween. In addition, first and second support frames may be included to make the first and second shafts have a second degree of freedom and transmit and receive power therebetween.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
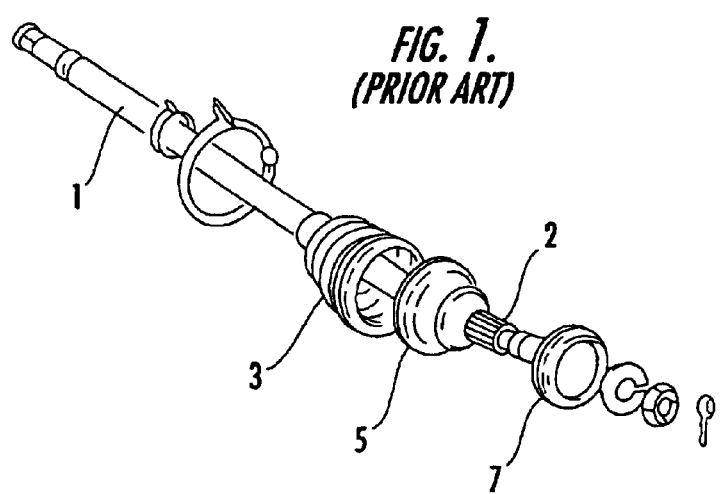
FIG. 1 is a perspective view showing the construction of a prior art constant velocity joint.
Figure 2:
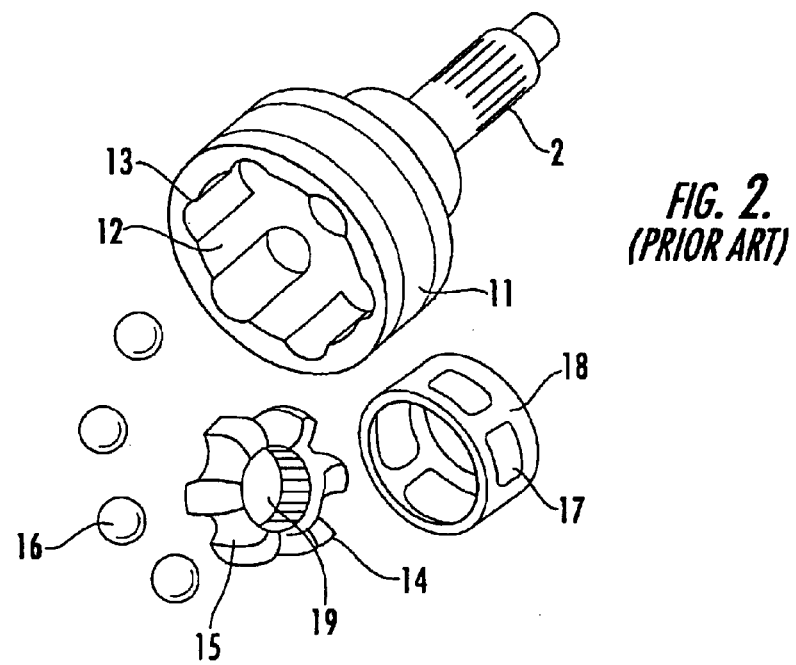
FIG. 2 is a detailed perspective view showing the construction of the principal elements of the prior art constant velocity joint of FIG. 1.
Figure 3:
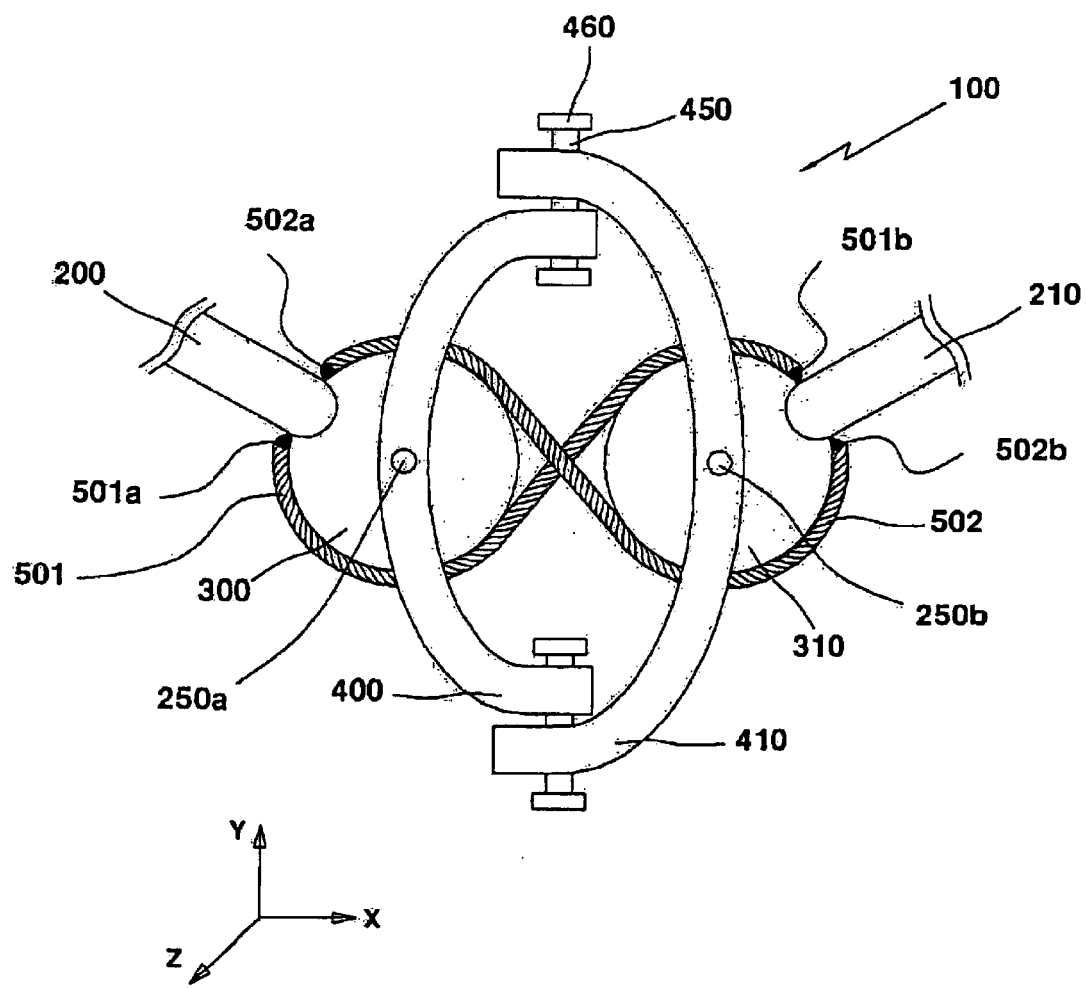
FIG. 3 is a front view showing the construction of a pulley type constant velocity joint in accordance with the present invention.
Figure 4:
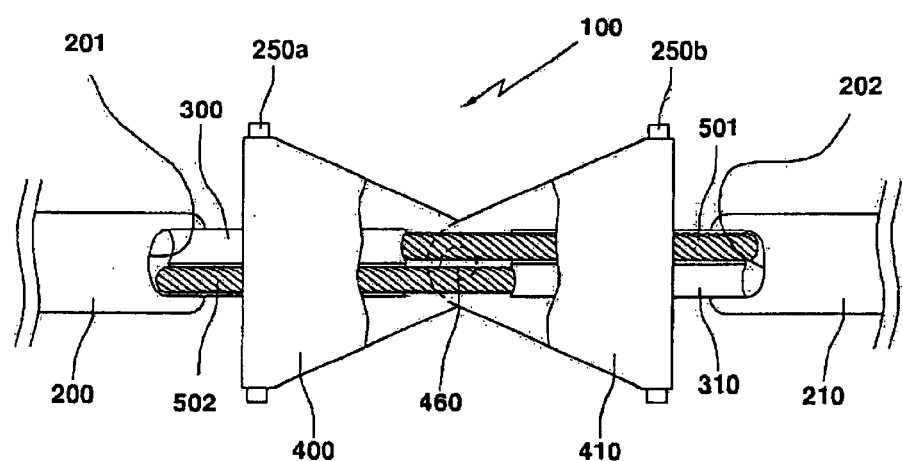
FIG. 4 is a plan view showing the construction of the pulley type constant velocity joint of the present invention.
Figure 4:
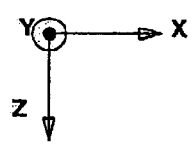
Figure 8:
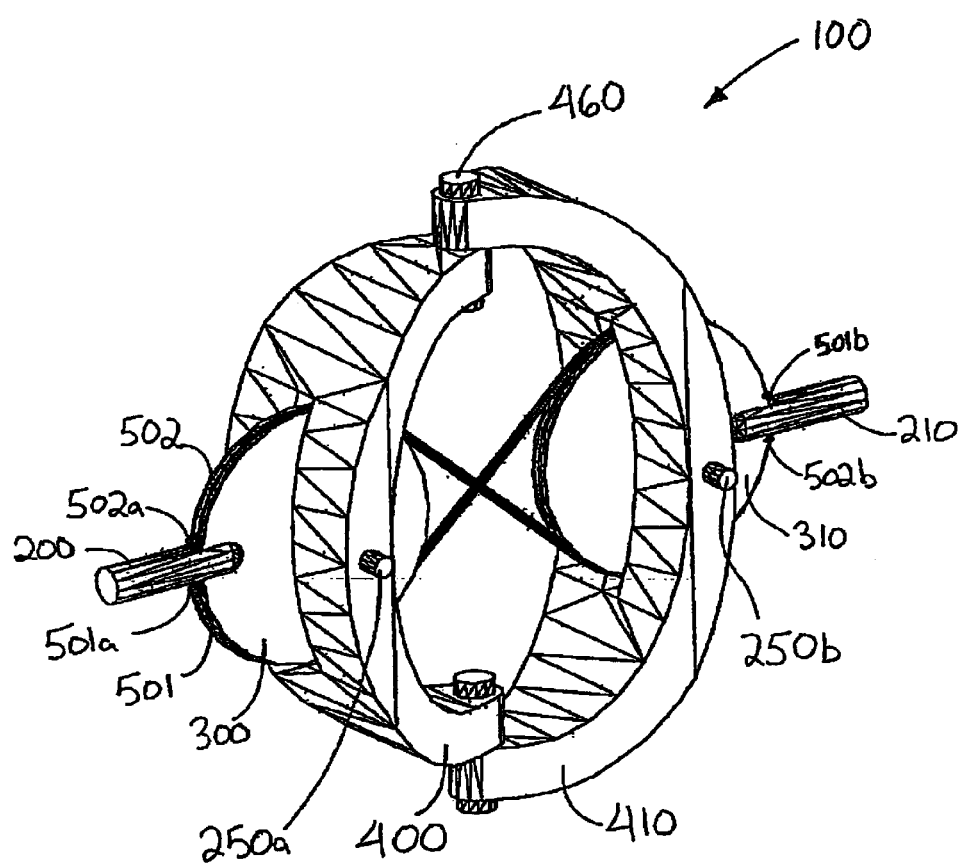
FIG. 8 is a perspective view of the pulley type constant velocity joint of FIG. 3.

Turning now to FIGS. 3, 4, and 8, FIG. 3 is a front view showing the construction of a pulley type constant velocity joint in accordance with the present invention, and FIGS. 4 and 8 are a plan view and a perspective view, respectively, showing the construction of the pulley type constant velocity joint of FIG. 3. As illustrated in the drawings, the pulley type constant velocity joint 100 of the present invention includes first and second shafts 200 and 210 as input and output shafts, respectively, first and second support frames 400 and 410 for allowing the first and second shafts 200 and 210 to be rotated around rotating pins 250a, 250b, and two connecting pins 450 for connecting the first and second support frames 400 and 410 to allow them to be rotated relative to each other.

Two pulleys 300 and 310 are fixedly attached to the inner ends of the first and second shafts 200 and 210. First and second elongate members or wires 501, 502 are wound around the circumferential grooves of the pulleys 300 and 310 in a crossing position and are fixed at predetermined positions 501a, 502a and 501b, 502b on the pulleys, respectively. Accordingly, if the first shaft 200 is rotated around one rotating pin 250b, the second shaft 210 is rotated around the other rotating pin 250b at the same time. Therefore, the first and second shafts 200 and 210 maintain bilateral symmetry with each other at all times. Here, the wires 501, 502 are preferably made of metal to enhance their durability.

The first pulley 300 is fixedly attached to the inner end of the first shaft 200, which functions as an input shaft, while the second pulley 310 is fixedly attached to the inner end of the second shaft 210, which functions as an output shaft. The first pulley 300 is rotatably supported by the first support frame 400 at the center of the first support frame 400, while the second pulley 310 is rotatably supported by the second support frame 410 at the center of the second support frame 410. In such a case, a plurality of through holes are formed through the centers of the first and second pulleys 300 and 310 and the centers of the first and second frames 400 and 410, and the rotating pins 250a and 250b are inserted into the through holes.

Each of the first and second pulleys 300 and 310 has a disk shape, and each of the first and second support frames 400 and 410 has an arc shape. The disk-shaped pulleys 300 and 310 are rotatably attached at their centers to the support frames 400 and 410 by the rotating pins 250a, 250b. Two couples of neighboring ends of the support frames 400 and 410 are connected by the connecting pins 450 to allow them to be rotated, respectively. The first and second pulleys 300 and 310 are secured in place by the first and second support frames 400 and 410, which have portions adjacent both sides of the first and second pulleys (see FIG. 4), and are capable of being rotated around the rotating pins 250a, 250b.

The wires 501, 502 are wound around the circumferential grooves of the first and second pulleys 300 and 310 to cross itself to form a figure-eight loop. By the wires 501, 502, when the first pulley 300 is rotated, the second pulley 310 is rotated at the same rate in the opposite direction, thereby causing the rotation of the first and second pulleys 300 and 310 to be symmetric. Accordingly, the first shaft 200 attached to the first pulley 300 and the second shaft 210 attached to the second pulley 310 are symmetrically rotated.

In this case, the wires 501, 502 are preferably fixed to the inner ends of the first and second shafts 200 and 210 at 501a, 502a, and 501b, 502b, respectively, to prevent the wire 500 from slipping on the circumferential grooves of the first and second pulleys 300 and 310. Two holding portions 460 are formed on both ends of each connecting pin 450, which connect the first and second support frames 400 and 410 to prevent the connecting pins 450 from being removed from the first and second support frames 400 and 410.

Figure 5:
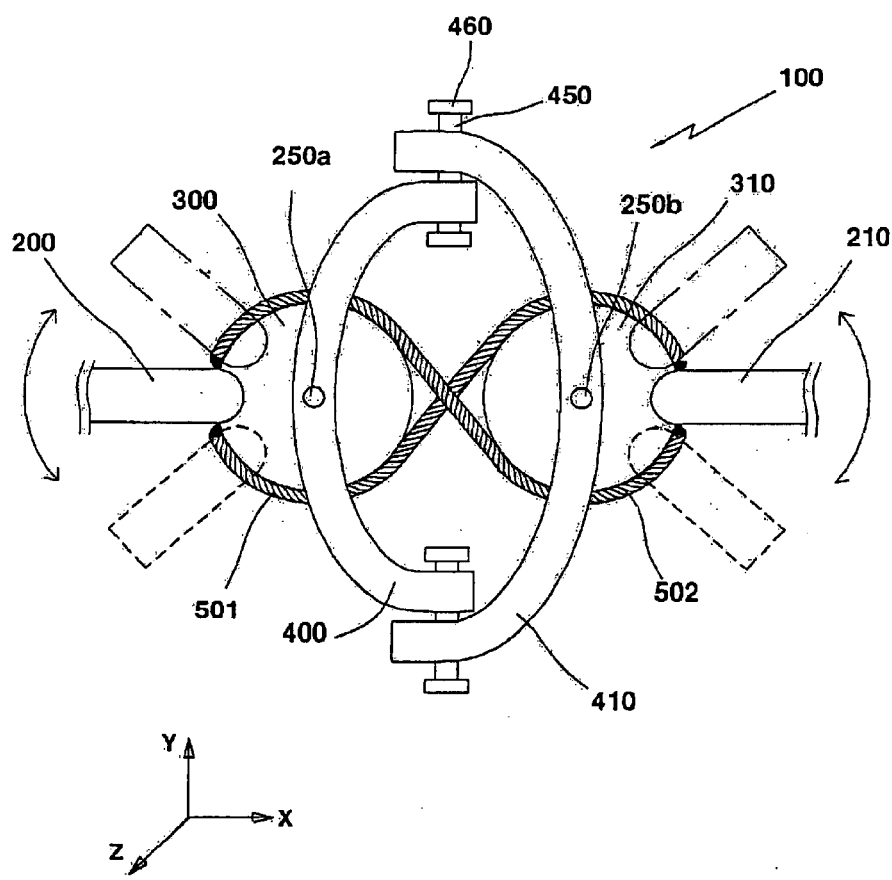
FIG. 5 is a front view showing the state in which force is applied to the first shaft in a Y-axis direction and the first and second shafts are rotated.
Figure 6:
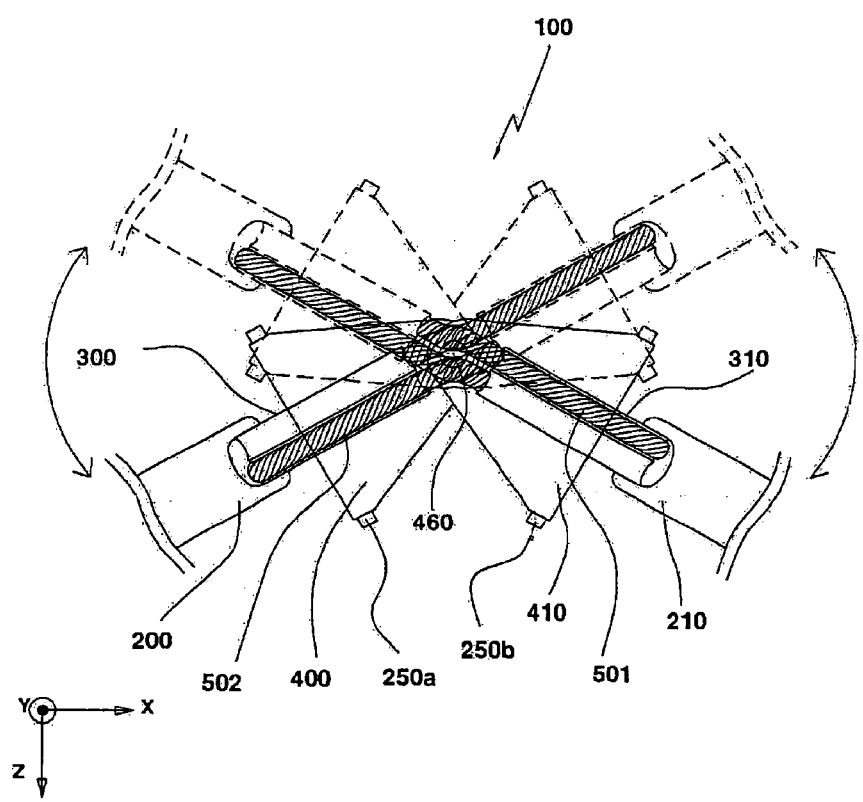
FIG. 6 is a plan view showing the state in which force is applied to the first shaft in Z-axis direction and the first and second shafts are rotated.

The operation of the pulley type constant velocity joint of the present invention will now be explained with reference to FIGS. 5 and 6. More particularly, FIG. 5 is a front view of a state in which force is applied to the first shaft 200 in the Y-axis direction and the first and second shafts 200 and 210 are rotated. Similarly, FIG. 6 is a plan view showing the state in which force is applied to the first shaft 200 in the Z-axis direction and the first and second shafts 200 and 210 are rotated.

The pulley type constant velocity joint 100 of the present invention is situated at a position where the first and second shafts 200 and 210 are connected to each other. It should be noted here that the intersection angles of the first and second shafts 200 and 210 are described relative to the XYZ axis orientation provided in the figures.

When force is applied to the outer end of the first shaft 200 in the Y-axis direction, the first pulley 300 attached to the inner end of the first shaft 200 is rotated in the direction opposite that of the first shaft 200. Additionally, the second pulley 310 is rotated in the same direction as the first shaft 200, and the second shaft 210 is rotated in the direction opposite to that of the first shaft 200. As a result, the second shaft 210 is rotated at the same angle as that at which the first shaft 200 is rotated. Each of the upper and lower intersection angles is divided into two equal angles by the line connecting the connecting pins 450.

Thereafter, when force is applied in the Z-axis direction, operation of the pulley type constant velocity joint is as follows. When force is applied to the outer end of the first shaft 200 in the Z-axis direction, the portion of the wire 500 between the first and second pulleys 300 and 310 is bent in the Z-axis direction and, at the same time, the first support frame 400 near the first shaft 200 is rotated in the same direction as that of the first shaft 200.

In this case, as the first shaft 200 is rotated, the axis connecting the two connecting pins 450 is situated on the plane dividing the intersection angle of the first and second support frames 400 and 410 into two equal angles. As described above, each of the first and second shafts 200 and 210 has two degrees of freedom in the Z and Y-axes.

Figure 7A:
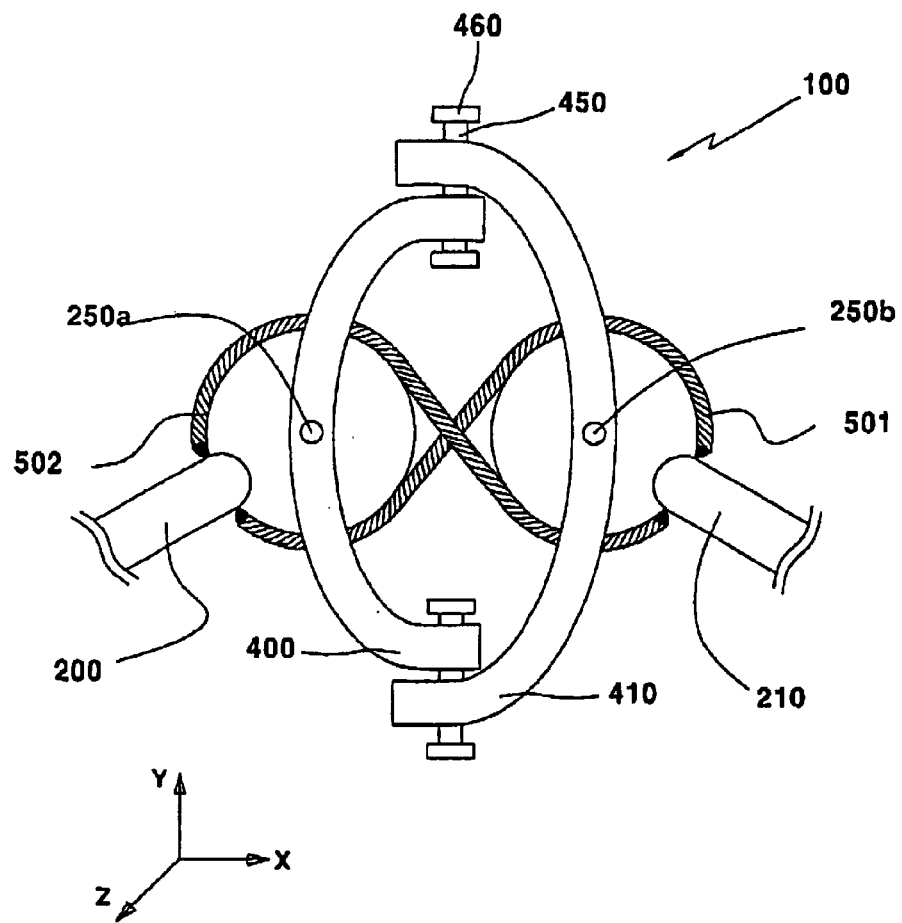
FIGS. 7A and 7B are front and plan views, respectively, showing operation of the pulley type constant velocity joint in accordance with the present invention when the shafts rotate at a respective predetermined position to transmit and receive rotating power therebetween.
Figure 7B:
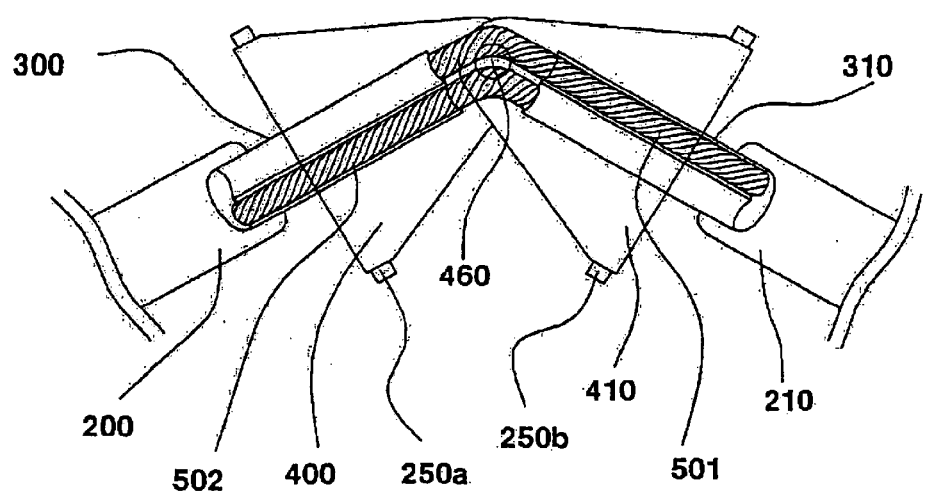
Figure 7B:
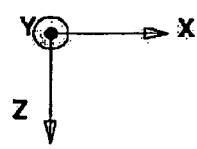

Next, when a driving force is applied to the first shaft 200, the operation of the pulley type constant velocity joint is as follows. The plane bisecting the supporting frames 400 and 410 passes through the connecting pins 450. This bisecting plane is always the plane of symmetry of the constant velocity joint 100. Accordingly, the first and second shafts 200 and 210 are always moving in symmetry with respect to this bisecting plane, which is also the plane of symmetry. This symmetricalness includes the axial rotations of the first and second shafts 200 and 210. That is, the first and second shafts 200 and 210 axially rotate in the same angular velocity no matter what the angle is between the first and second shafts 200 and 210. Operation of the CV joint when the shafts 200, 210 rotate at respective predetermined positions to transmit and receive power therebetween is shown in FIGS. 7A and 7B.

As described above, the present invention provides a pulley type constant velocity joint in which the wires 501, 502 are wound around the circumferential grooves of the pulleys 300 and 310 and cross one another. Thus, the first and second pulleys 300 and 310 are operated in conjunction with each other. This thereby allows the input and output shafts to be symmetrically situated and causes the rotational movement of the input shaft to be transmitted to the output shaft at the same velocity.

In contrast to the conventional constant velocity joint of the prior art, the pulley type constant velocity joint of the present invention has a relatively simple structure in which the wires 501, 502 are wound around the circumferential grooves of the pulleys 300 and 310. Accordingly, the pulley type constant velocity joint has a low failure rate due to its relatively simple structure.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

That which is claimed is:

1. A constant velocity joint comprising:
   first and second shafts;
   a first pulley directly connected to an end of said first shaft;
   a second pulley directly connected to an end of said second shaft;
   first and second elongate members for respectively causing said first and second pulleys to move symmetrically about respective centers thereof in opposite directions to provide said first and second shafts a first degree of freedom; and
   first and second support frames for causing said first and second shafts to have a second degree of rotational freedom and to transmit and receive power therebetween.

2. The pulley type constant velocity joint according to claim 1 further comprising:
   a pin for rotatably connecting a center of said first pulley to said first support frame and a pin for rotatably connecting a center of said, second pulley to said second support frame; and
   respective connecting pins for rotatably connecting ends of said first and second support frames.

3. A pulley type constant velocity joint comprising:
   first and second shafts for transmitting and receiving power therebetween;
   a first pulley directly connected to an end of said first shaft, said first pulley having circumferential grooves defined therein;
   a second pulley directly connected to an end of said second shaft, said second pulley having circumferential grooves defined therein;
   a first elongate member wound around a first set of the circumferential grooves of said first and second pulleys for causing said first and second pulleys to rotate about respective centers thereof in a first direction, said first elongate member having first and second ends respectively connected to the first and second pulleys adjacent said first and second shafts;
   a second elongate member wound around a second set of the circumferential grooves of said first and second pulleys for causing said first and second pulleys to rotate about the respective centers thereof in a second direction opposite the first direction, said second elongate member having first and second ends respectively connected to said first and second pulleys adjacent said first and second shafts; and
   a first support from rotatably supporting said first pulley and a second support frame rotatably supporting said second pulley, said first and second support frames having respective ends rotatably connected together.

4. The pulley type constant velocity joint according to claim 3 further comprising respective pins connecting said first support frame to a center of said first pulley and said second support frame to a center of said second pulley.

5. The pulley type constant velocity joint according to claim 3 further comprising respective connecting pins for connecting the ends of said first and second support frames together.

6. The pulley type constant velocity joint according to claim 5 wherein said connecting pins each comprise a holding portion at at least one end thereof.

7. The pulley type constant velocity joint according to claim 3 wherein said first and second elongate members comprise metal.

8. The pulley type constant velocity joint according to claim 3 wherein said first and second elongate members are connected to the ends of said first and second shafts.

9. The pulley type constant velocity joint according to claim 3 wherein said first support frame comprises portions adjacent both sides of said first pulley.

10. The pulley type constant velocity joint according to claim 3 wherein said second support frame comprises portions adjacent both sides of said second pulley.

11. The pulley type constant velocity joint according to claim 3 wherein said first and second shafts are symmetrically aligned with respect to an imaginary symmetric plane bisecting said first and second supporting frames.

12. A pulley type constant velocity joint comprising:

first and second shafts for transmitting and receiving power therebetween;

a first pulley directly connected to an end of said first shaft and having circumferential grooves defined therein and a second pulley directly connected to an end of said second shaft and having circumferential grooves defined therein;

a first elongate member winding around a first set of the circumferential grooves of said first and second pulleys to cause said first and second pulleys to symmetrically rotate about respective centers thereof in a first direction to provide a first degree of freedom, said first elongate member having first and second ends respectively connected to said first and second pulleys adjacent said first and second shafts;

a second elongate member wound around a second set of the circumferential grooves of said first and second pulleys for causing said first and second pulleys to rotate about the respective centers thereof in a second direction opposite the first direction, said second elongate member having first and second ends respectively connected to said first and second pulleys adjacent said first and second shafts; and a first support frame rotatably supporting said first pulley and a second support frame rotatably supporting said second pulley, said first and second support frames having respective ends rotatably connected together to provide a second degree of freedom.

13. The pulley type constant velocity joint according to claim 12 further comprising:

a respective pin for rotatably connecting a center of said first pulley to said first support frame and a center of said second pulley to said second support frame; and respective connecting pins for connecting the ends of said first support frame to the ends of said second support frame.

14. The pulley type constant velocity joint according to claim 12 wherein said first and second elongate members are fixedly attached to the ends of said first and second shafts.

* * * * *